United States Patent [19]

Oeder et al.

[11] 4,074,040
[45] Feb. 14, 1978

[54] MANUFACTURE OF ETHYLENE POLYMERS IN AN AUTOCLAVE REACTOR

[75] Inventors: Dieter Oeder, Weisenheim; Hans Gropper, Ludwigshafen; Friedrich Urban, Limburgerhof, all of Germany

[73] Assignee: BASF Aktiengesellschaft, Ludwigshafen, Germany

[21] Appl. No.: 758,208

[22] Filed: Jan. 10, 1977

[30] Foreign Application Priority Data

Mar. 18, 1976  Germany .............................. 2611405

[51] Int. Cl.$^2$ .......................... C08F 2/02; C08F 10/02
[52] U.S. Cl. ..................................... 526/352; 526/331
[58] Field of Search ......................................... 526/352

[56] References Cited

U.S. PATENT DOCUMENTS

| | | | |
|---|---|---|---|
| 2,897,183 | 7/1959 | Christl et al. | 526/352 |
| 3,256,069 | 6/1966 | Peterson | 526/352 |
| 3,536,693 | 10/1970 | Schrader et al. | 526/352 |
| 3,575,950 | 4/1971 | Gleason et al. | 526/352 |
| 3,692,763 | 9/1972 | Van Saane et al. | 526/352 |
| 3,756,996 | 9/1973 | Pugh et al. | 526/352 |
| 3,875,128 | 4/1975 | Suzuki et al. | 526/352 |
| 3,956,256 | 5/1976 | Mercx | 526/352 |
| 3,963,690 | 6/1976 | Pruitt et al. | 526/352 |

FOREIGN PATENT DOCUMENTS

| | | | |
|---|---|---|---|
| 942,265 | 11/1963 | United Kingdom | 526/352 |
| 1,101,763 | 1/1968 | United Kingdom | 526/352 |

*Primary Examiner*—Alan Holler
*Attorney, Agent, or Firm*—Keil, Thompson & Shurtleff

[57] ABSTRACT

Ethylene polymers are manufactured by polymerizing ethylene under high pressure at high temperatures in an autoclave reactor. The heat of reaction generated by the polymerization is removed, within the reactor, by a cooling system in which the cooling medium is ethylene; the pressure of the monomer in the cooling system should differ by from 0 to 200 bars from the pressure prevailing in the polymerization system, and the temperature of the monomer on entering the cooling system is at least 40° C lower than the temperature prevailing in the autoclave. The process permits an increase in the conversion achieved in the polymerization reaction.

2 Claims, No Drawings

MANUFACTURE OF ETHYLENE POLYMERS IN AN AUTOCLAVE REACTOR

The present invention relates to a process for the manufacture of ethylene polymers by homopolymerization of ethylene or copolymerization of ethylene with other compounds, copolymerizable with ethylene, under high pressure.

In this process, the monomers are introduced into a polymerization system in which pressures of from 500 to 5,000 bars and temperatures of from 100° to 300° C prevail. A part of the heat of reaction generated by the polymerization is removed by a cooling system located in the interior of the polymerization system but separate therefrom.

The process for the manufacture of ethylene polymers under high pressure in a polymerization system such as an autoclave reactor is an adiabatic process in which the heat generated by the polymerization reaction is not removed either by cooling of the walls or by outward radiation.

To achieve stable reaction conditions, cold highly compressed ethylene is fed continuously to the autoclave reactor and takes up the heat of reaction whilst becoming heated to the reaction temperature. It is important that the cold ethylene entering the polymerization system should be mixed rapidly and uniformly with the contents of the polymerization system. In most cases, mixing is achieved by using stirrers of special design, rotating at high speed. It is also possible to divide the freshly introduced ethylene into several part-streams or take similar measures. However, regardless of the specific details of the process, the degree of conversion of ethylene to polyethylene always depends on the heat capacity of the freshly introduced ethylene, which depends on the difference between the permissible reaction temperature and the temperature at which the gas enters. Hence, an increase of the conversion to ethylene polymer is only achievable by increasing the reaction temperature and/or by lowering the temperature at which the gas enters.

However, increasing the reaction temperature above about 300° C which is the conventional limit in industrial operation (cf. Chimia 28, (1974), page 382) would substantially increase the risk of decomposition of the polymer formed. Furthermore, important properties of the ethylene polymers, eg. the density, depend on the reaction temperature and this reason in itself debars an arbitrary increase in reaction temperature. Lowering the temperature, at which the gas enters, to very low levels is only feasible to a certain degree, for economic and technical reasons.

Because of the state of the art described above, there have been numerous proposals for increasing the conversion in the autoclave process by other measures. Examples which may be mentioned are the introduction of additional heat-absorbing substances, eg. water or benzene, into the reactor, or polymerization in two autoclave reactors connected in series by pipelines and a heat exchanger, the reaction mixture, after leaving the first autoclave reactor, being cooled on passing through the heat exchanger, and then being fed into the second reactor to continue the polymerization (cf. German Laid-Open Application No. 2,322,554).

German Laid-Open Application No. 1,745,462 discloses a process in which the heat of reaction can be removed by cooling channels in the reactor wall and the conversion during polymerization can be increased thereby. In this process, the coolant flows through the said channels under atmospheric or only slightly increased pressure. The dimension of the reactor inner wall must therefore be such as to be able to withstand the reaction pressure. However, the relatively thick walls which this requires entail considerable expenditure on apparatus in the interior of the autoclave reactor. Furthermore, the resistance to heat flow increases with increasing wall thicknesses of the cooling system. Since the volume available in the interior of the autoclave reactor is limited, the bulky cooling apparatus deprives the polymerization system of reaction space.

Processes of the type described above also suffer from disadvantages because they demand extensive additional equipment and are technically complicated and therefore prone to faults.

It is an object of the present invention to avoid the above disadvantages and to develop an autoclave polymerization process which makes it possible to achieve a substantial increase in conversion, with little technical effort, in comparison to conventional processes, and which operates safely and reliably.

We have found that this object is achieved by a process in which the monomers, under a pressure of from 500 to 5,000 bars, are passed continuously through the cooling system in the interior of the polymerization system, the pressure of the monomers in the cooling system differing by from 0 to 200 bars from that prevailing in the polymerization system and the temperature of the monomers on entering the cooling system being at least 40° C lower than the temperature prevailing in the polymerization system.

In a preferred embodiment of the process, the monomers coming from the cooling system are passed through a heat exchanger located outside the polymerization system, are cooled thereby, and are then introduced into the polymerization system.

It is an advantage of the process of the invention that a larger cooling surface can be provided for cooling the contents of the autoclave, since the apparatus of the cooling system does not have to be resistant to high pressure and a cooling system constructed of thin pipes can advantageously be employed within the autoclave. The object of cooling the interior of the polymerization system at high pressures can be achieved, according to the invention, without expensive apparatus. The process gives extremely uniform and homogeneous polymers. These polymers are furthermore distinguished by having a high degree of branching, and hence a lower density and lower crystallinity, than products which are manufactured at the same pressure and the same reaction temperature, but without internal cooling of the reactor.

The process according to the invention is applicable to the homopolymerization of ethylene and to the copolymerization of ethylene with other compounds copolymerizable with ethylene. Accordingly, suitable monomers are ethylene and a mixture of ethylene with any other compounds which can conventionally be copolymerized with ethylene under high pressure conditions in the presence of catalysts which form free radicals. Examples of such compounds are acrylic acid and its esters, eg. methyl acrylate, ethyl acrylate, n-, iso- and tert.-butyl acrylate and 2-ethylhexyl acrylate and the corresponding methacrylates vinyl esters such as vinyl acetate, vinyl propionate and vinyl pivalate, methacrylic acid, vinyl ethers, vinyl ketones, acrylonitrile, acrylamide, unsaturated hydrocarbons, eg. propene, butene or hexene, carbon monoxide, sulfur dioxide and mixtures of these compounds. Examples of catalysts which form free radicals, and which are employed in the conventional manner and in conventional amounts, are peroxides, such as di-tert.-butyl peroxide or tert.-butyl perpivalate, percarbonates, acetylsulfonyl peroxide, hydroperoxides, eg. tert.-butyl hydroperoxide, and azo compounds, eg. azo-bis-isobutyronitrile. The high pressure polymerization can be carried out in the presence of conventional molecular weight regulators used in conventional amounts. Examples of suitable regulators are saturated hydrocarbons, eg. propane, butane, hexane and cyclohexane, ketones, eg. acetone and methyl ethyl ketone, aldehydes, alcohols, eg. isopropanol and n-butanol, and hydrogen.

The polymerization of ethylene, in the presence or absence of other compounds, is carried out at pressures of from 500 to 5,000 bars, preferably from 1,000 to 2,500 bars. The temperatures in the polymerization system are from 100° to 300° C, preferably from 150° to 280° C. The conditions required for the polymerization system are achieved in autoclave reactors. These are conventionally cylindrical reaction vessels, the interior of which in most cases has a ratio of height to diameter of the circular cross-section of from 1:1 to 20:1, preferably from 2:1 to 10:1. The autoclave reactors are conventionally equipped with a high-speed rotary stirrer driven by an internal or external motor. The design of the stirrer must ensure that a certain distance from the cooling device fitted into the autoclave is maintained. Information on processes in which autoclave reactors are used are to be found, for example, in Ullmanns Enzyklopadie der Technischen Chemie, 3rd edition, volume 14, pages 137–148.

The heat of reaction liberated inside the autoclave reactor when polymerizing ethylene or copolymerizing ethylene with other copolymerizable compounds is in part removed by a cooling system located inside the autoclave reactor. In this way, the temperature of the reaction mixture in the autoclave can be adjusted by utilizing the remainder of the heat of reaction liberated. According to the invention, the cooling system is entirely located inside the autoclave and the reaction mixture flows round it, so that heat exchange between the hot reaction mixture and the cold coolant in the interior of the sealed cooling device takes place through the wall and accordingly the reaction mixture cannot mix with the coolant. The design of the cooling system depends on the geometry of the reactor. It may be, for example, a coil resting against the inner wall of the autoclave, but other forms are also possible.

However, it is essential that the cooling system should have at least one inlet, sealed off from the interior of the autoclave, for the coolant, and a comparable outlet for the coolant, so that the latter, on passing through the cooling device, cannot enter the polymerization system, ie. the reaction space, and cannot mix with the reaction mixture.

According to the process of the invention, the monomers, ie. ethylene or ethylene mixed with other compounds copolymerizable with ethylene, are passed continuously, under a pressure of from 500 to 5,000 bars, through the cooling system in order to act as the coolant, and the pressure of the monomers in the cooling system differs by from 0 to 200 bars from the pressure prevailing in the polymerization system. Preferably, the highly compressed coolant, eg. ethylene, is at the same, or virtually the same, pressure as the reaction mixture within the autoclave. A slight difference in the pressures, of the order of magnitude of from 20 to 200 bars, is, however, also admissible but in order to make the process as simple as possible to operate, the pressure difference should be zero or as low as possible. If the pressure differences are high, a lasting increase in the conversion is no longer achievable.

The coolant or monomer used is preferably pure compressed ethylene, as furnished by very high pressure compressors of conventional construction. The amount of ethylene passed through the cooling device is chosen in accordance with the geometrical dimensions of the installation, the heat transfer and the desired increase in conversion. Instead of pure ethylene it is possible to use a compressed mixture of ethylene, other compounds copolymerizable with ethylene, and conventional additives such as molecular weight regulators, solvents and the like. However, the coolant must not contain any catalyst capable of initiating a polymerization at the temperature and pressure conditions which the coolant assumes in the cooling device.

The temperature of the coolant, ie. ethylene or a mixture of ethylene and comonomer, should be at least 40° C lower — when entering the cooling system — than the temperature prevailing in the polymerization system. A preferred temperature difference between the coolant and the reaction mixture is from 100° to 250° C. The coolant comprising the monomers flows continuously through the cooling system and thereby becomes heated so that after leaving the cooling system it has a higher temperature than on entering the cooling system.

After the cooling medium, ie. ethylene or a mixture of ethylene and comonomer, has left the cooling system, it may be subjected to various further treatments. For example, it may be cooled, let down and returned to the intake side of the extreme-pressure compressor. However, the coolant can also be let down to a pressure of from about 250 to 350 bars and be fed to the let-down reaction mixture in the separator.

In a particularly advantageous embodiment of the process according to the invention, the heated ethylene leaving the cooling device, which ethylene may still contain regulator, comonomer and solvent, is initially not let down but flows, under virtually the same pressure, through a further heat exchanger, located outside the autoclave, where it becomes cooled, and is then introduced in the conventional manner into the autoclave reactor. A special compressor unit for the ethylene coolant is not required. The very high pressure compressor, which provides ethylene for the process, this ethylene being fed directly to the reactor in the conventional autoclave process, at the same time furnishes the highly compressed ethylene required for internal cooling. The amount of ethylene required for cooling inside the autoclave is branched off the compressor output and is then fed to the autoclave in the manner which has been described. In such a case, the maximum amount of ethylene available for cooling is limited to the amount delivered by the compressor and corresponds to the ethylene throughput of the process. As a rule, this suffices for a substantial increase in conversion.

The increase in conversion achievable by the process according to the invention depend essentially on the heat transfer between the reaction mixture and the heat exchanger. This heat transfer is particularly good in the case of relatively low molecular weight products or waxy products. With these, increases in conversion of more than 50% are achievable. In the case of polyethylene of higher molecular weight, the increase in conversion becomes less, because of the poorer heat transfer.

The various Examples which follow illustrate the invention.

EXAMPLE 1

The reactor used for the experiments consists of an autoclave having an internal capacity of 15 liters and a length/diameter ratio of 2.5:1. An electric motor with a multiblade propeller stirrer driven at 1,000 rpm is used to achieve thorough mixing. A cooling coil consisting of a 15 m long metal pipe is fitted into the reactor. The pipe has an external diameter of 10 mm and a wall thickness of 1 mm. Its two ends are tightly connected to two bores passing through the upper lid of the autoclave, so that the medium flowing through the cooling device cannot come into contact with the actual reactor contents at this point.

Per hour, 422 kg of ethylene and 1.4 liters of acetone, to act as a molecular weight regulator, are fed into the reaction space under a pressure of 2,000 bars, and at 25° C. As a result of the addition of 6.3 mole ppm of t-butyl perpivalate and 12.6 mole ppm of t-butyl peracetate as initiators, a temperature of 240° C becomes established in the reactor.

At the same time, 300 kg of ethylene per hour are passed, at a pressure of 2,000 bars, through the cooling coil. The ethylene coolant enters one end of the coil at a temperature of 35° C. As a result of heat transfer from the reaction mixture, the ethylene coolant is heated to 101° C as it passes through the coil. It is then cooled in a heat exchanger outside the autoclave and returned to the coolant circuit.

The reaction mixture is let down from the autoclave by conventional methods, resulting in a separation of the unconverted ethylene from the polymer formed. A polyethylene having a density of 0.923 g/cm³ and a melt index of 3.9 g/10 minutes (measured according to ASTM D 1238 65-T at 190° C and 2.16 kg) is obtained, the conversion being 19.1%.

COMPARATIVE EXAMPLE 1

The autoclave described in Example 1 is used, but without the internal cooling coil. Per hour, 416 kg of ethylene under a pressure of 2,000 bars and at 25° C are fed to the reactor. The addition of smaller amounts of initiator than in Example 1, namely 5.5 mole ppm of t-butyl perpivalate and 11.2 mole ppm of t-butyl peracetate, already produces a temperature of 240° C in the reactor.

Under the stated conditions, a polyethylene having a density of 0.924 g/cm³ and a melt index of 4.1 g/10 minutes (measured according to ASTM D 1238 65-T at 190° C and 2.16 kg) is obtained, the conversion being 15.9%.

COMPARATIVE EXAMPLE 1a

The autoclave used in Comparative Example 1 is employed and is fed with 416 kg of ethylene per hour, under a pressure of 2,000 bars and at 25° C. However, as in Example 1, 6.3 mole ppm of t-butyl perpivalate and 12.6 mole ppm of t-butyl peracetate are in this case added as the initiator. This results in the temperature in the reactor assuming a value of 256° C.

In this way, a polyethylene having a density of 0.922 g/cm³ and a melt index of 4.6 g/10 minutes (measured according to ASTM D 1238 65-T at 190° C and 2.16 kg) is obtained, the conversion being 17.0%.

EXAMPLE 2

The autoclave with internal cooling device, described in Example 1, is used. A mixture of 361 kg of ethylene and 15.8 l of acetone, coming from the ethylene compressor, is fed hourly under a pressure of 2,000 bars and at 35° C into the cooling coil. In the latter, the mixture is heated to 198° C by heat transfer from the reaction mixture. After leaving the cooling coil, the hot mixture is again cooled to 35° C in an external heat exchanger and is fed, after addition of 13.3 mole ppm of t-butyl perpivalate and 26.6 mole ppm of t-butyl peracetate, into the actual reaction space, where the temperature assumes a value of 260° C and the pressure is just below 2000 bars.

Under the stated conditions, a low molecular weight waxy polyethylene having a melt viscosity of 1,250 mm²/sec (at 120° C) is obtained, the conversion being 33.6%. The polyethylene has a melting point of 97°-99° C and a density of 0.923 g/cm³.

COMPARATIVE EXAMPLE 2

The autoclave described in Example 1 is used, but without a cooling device. The mixture of ethylene and acetone described in Example 2, with smaller amounts of initiator, namely 10.1 mole ppm of t-butyl perpivalate and 20.2 mole ppm of t-butyl peracetate, is fed into the autoclave under a pressure of 2,000 bars and at 35° C. The reaction temperature again assumes a value of 260° C.

A low molecular weight waxy polyethylene having a melt viscosity of 1,180 mm²/sec (at 120° C) is obtained, the conversion being 19.8%. The melting point of the polyethylene is 105°-107° C and the density is 0.929 g/cm³.

EXAMPLE 3

Per hour, a mixture of 342 kg of ethylene, 75 kg of vinyl acetate and 1.0 liter of acetone is fed into the reactor described in Example 1. The mixture, which is under a pressure of 1,700 bars, enters the cooling coil at 35° C and is heated therein to 110° C by heat transfer. After leaving the cooling coil, the gas is cooled to 9° C in a downstream cooler and is then fed into the actual reaction space. Immediately before entering the latter, 20.3 mole ppm of t-butyl perpivalate are added, as an initiator, to the reaction mixture. As a result, the temperature in the reactor assumes a value of 195° C and the pressure is just below 2000 bars.

Per hour, 90.5 kg of an ethylene/vinyl acetate copolymer having a vinyl acetate content of 29.6% by weight and a melt index of 115 g/10 minutes (measured according to ASTM D 1238 65-T at 190° C and 2.16 kg) are obtained. The density of the product is 0.947 g/cm³.

COMPARATIVE EXAMPLE 3

The procedure described in Example 3 is followed, except that the reaction mixture described in the said Example, but containing smaller amounts of initiator, namely 17.8 mole ppm of t-butyl perpivalate, is fed directly, at 9° C, into the reaction space. In this case, the reactor does not contain a cooling coil.

The reaction temperature is 195° C, and per hour 71.5 kg of a polymer having a vinyl acetate content of 30.5% by weight and a melt index of 120 g/10 minutes (measured according to ASTM D 1238 65-T at 190° C and 2.16 kg) are obtained. The density of the product is 0.949 g/cm$^3$.

We claim:

1. A process for the manufacture of an ethylene polymer by homopolymerization of ethylene or copolymerization of ethylene with one or more copolymerizable monomers by introducing the monomer(s) into a polymerization system in which pressures of from 500 to 5,000 bars and temperatures of from 100° to 300° C prevail, and removing a part of the heat of reaction generated by the polymerization by means of a cooling system located in the interior of the polymerization system but separate therefrom, wherein the monomer(s), under a pressure of from 500 to 5,000 bars, is passed continuously through the cooling system, the pressure of the monomer(s) in the cooling system differing by from 0 to 200 bars from that prevailing in the polymerization system and the temperature of the monomer(s) on entering the cooling system being at least 40° C lower than the temperature prevailing in the polymerization system.

2. A process as claimed in claim 1, wherein the monomer(s) coming from the cooling system is passed through a heat exchanger located outside the polymerization system, are cooled thereby, and are subsequently introduced into the polymerization system.

* * * * *